United States Patent
Ogilvie et al.

(10) Patent No.: US 10,302,790 B2
(45) Date of Patent: May 28, 2019

(54) MARINE SURVEYING

(71) Applicant: Fugro N.V., Leidschendam (NL)

(72) Inventors: Angus James Stephen Ogilvie, Aberdeen (GB); Andrew Paul Cowlard, Wallingford (GB)

(73) Assignee: Fugro N.V. (NL)

( * ) Notice: Subject to any disclaimer, the term of this patent is extended or adjusted under 35 U.S.C. 154(b) by 0 days.

(21) Appl. No.: 15/534,431

(22) PCT Filed: Dec. 11, 2015

(86) PCT No.: PCT/NL2015/050857
§ 371 (c)(1),
(2) Date: Jun. 8, 2017

(87) PCT Pub. No.: WO2016/093699
PCT Pub. Date: Jun. 16, 2016

(65) Prior Publication Data
US 2017/0350998 A1  Dec. 7, 2017

(30) Foreign Application Priority Data

Dec. 12, 2014  (NL) .................................... 2013967

(51) Int. Cl.
*G01V 1/38* (2006.01)
*G01V 1/00* (2006.01)

(52) U.S. Cl.
CPC ............ *G01V 1/3808* (2013.01); *G01V 1/003* (2013.01); *G01V 2210/1293* (2013.01); *G01V 2210/1423* (2013.01)

(58) Field of Classification Search
CPC ........ G01V 1/38; G01V 1/3808; G01V 1/003; G01V 2210/1423; G01V 2210/1293
See application file for complete search history.

(56) References Cited

U.S. PATENT DOCUMENTS 2,627,930 A   2/1953  Woods
2,729,300 A   1/1956  Paslay et al.
(Continued)

FOREIGN PATENT DOCUMENTS

EP   2775323 A2   9/2014
WO   2013079547 A1   6/2013

OTHER PUBLICATIONS

International Search Report and Written Opinion; PCT Application No. PCT/NL2015/050857; dated May 11, 2016.
(Continued)

*Primary Examiner* — Ian J Lobo
(74) *Attorney, Agent, or Firm* — Polsinelli PC

(57) ABSTRACT

A system for surveying the structure beneath the seabed, comprising: a survey vessel; a streamer comprising a cable, a first set of N1 sensor groups positioned at a first end portion of the cable, the sensor groups of the first set being spaced from each other by a group interval, and a second set of N2 sensor groups positioned at a second end portion of the cable, the sensor groups of the second set being spaced from each other by the group interval; a sound source; wherein, when the system is in use, the survey vessel travels at a predetermined speed, towing the streamer and the sound source such that the sound source is positioned adjacent an intermediate portion of the cable between the first and second end portions of the cable; the sound source sends acoustic pulses at a predetermined period between pulses towards the seabed such that reflections are produced towards both the first set of sensor groups and the second set of sensor groups; and the speed of the survey vessel and the predetermined period of the sound source are selected such that the shot point interval of the sound source equals the group interval.

8 Claims, 7 Drawing Sheets

(56) References Cited

U.S. PATENT DOCUMENTS

| | | | |
|---|---|---|---|
| 3,806,863 A | | 4/1974 | Tilley et al. |
| 2006/0203613 A1* | | 9/2006 | Thomsen ............... G01V 3/083 367/38 |
| 2011/0044127 A1 | | 2/2011 | Kostov et al. |
| 2012/0275264 A1 | | 11/2012 | Kostov et al. |

OTHER PUBLICATIONS

Rob Hardy: "Seismic Acquisition", Basic seismic processing for interpreters; Jan. 29, 1999; pp. 1-13, XP055208707.

JL Mari et al: "Specific Acquisition Techniques"; In: "Signal Processing for Geologists and Geophysicists", Jan. 1, 1999; Technip, pp. 36-45; XP055208904.

Notification Concerning Transmittal of International Preliminary Report on Patentability; PCT Application No. PCT/NL2015/050857; dated Jun. 13, 2017.

\* cited by examiner

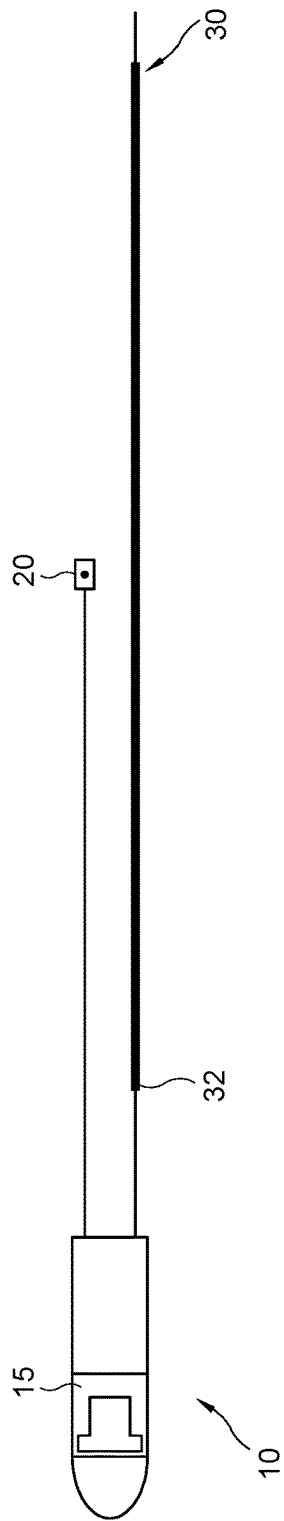
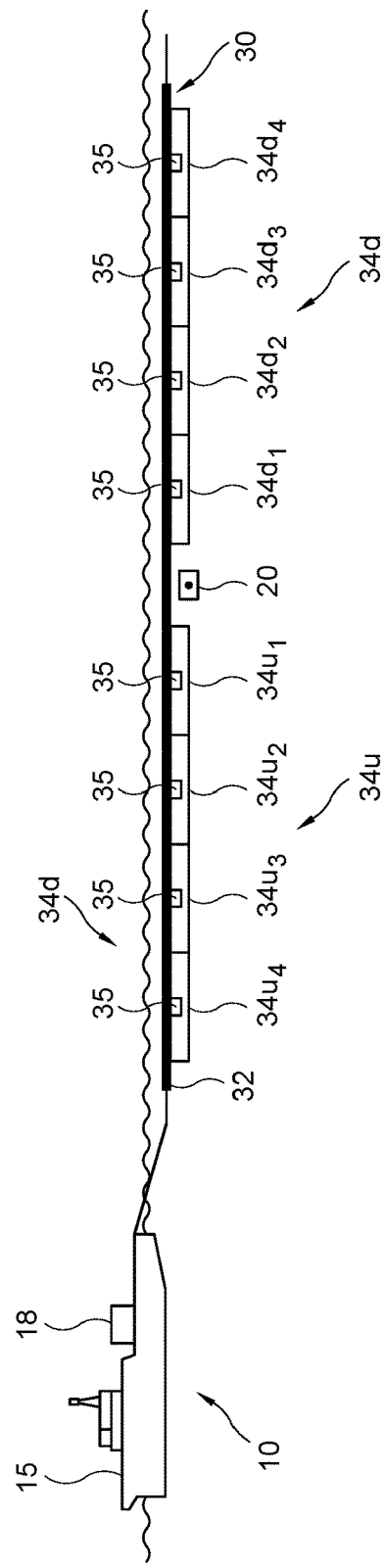
FIG. 4A
FIG. 4B

MARINE SURVEYING

CROSS-REFERENCE TO RELATED APPLICATIONS

This application is a national stage entry of International Application International Application No. PCT/NL2015/050857, which was filed on Dec. 11, 2015, which claims priority to The Netherlands Application No. 2013967, filed Dec. 12, 2014 and which is entirely incorporated by reference herein.

The present invention relates generally to the field of marine surveying. More particularly, the present invention relates to surveying the structure beneath the seabed using a towed streamer.

A known system 10 for surveying the structure beneath the seabed is shown in FIG. 1. In this system 10, a survey vessel 15 tows a sound source 20 and a streamer 30. The streamer 30 comprises a cable 32 and a set of sensor groups 34$d$, the sensor groups being positioned along the length of the cable at a constant spacing from each other; this spacing between the sensor groups is known as the group interval. For the purposes of diagrammatic simplicity, only 4 sensor groups, comprising 34$d$1,2,3,4 are shown, but in a typical system there may be several hundred sensor groups distributed along a 5 km cable. As can be seen from FIG. 1, the sound source 20 is towed between the survey vessel 15 and the leading sensor group of the streamer 30. The sound source 20 generates acoustic pulses or shots with a predetermined period between pulses that are directed downwardly towards the seabed. Since sound energy is reflected off the boundaries between layers of different densities and velocities (and hence acoustic impedance), as a transmitted pulse encounters the boundary between the water and the surface of the seabed, some of its energy is reflected and some of its energy penetrates further into the seabed. As its energy penetrates further into the seabed, further reflections occur as boundaries between layers of, for example, clay, sand and other sediments are encountered. The sensor groups 34$d$ receive the reflections that allow an image of the structure beneath the seabed to be built up.

Conventionally, the speed of the survey vessel and the period of firing of the sound source, i.e. the period between pulses, are selected such that the shot point interval SPI, i.e. the distance which the sound source travels between successive shots, is equal to half the group interval. Surveying at this standard speed is advantageous because it means that, for each reflection point on the surface of the seabed (known as the common mid point CMP), reflection data is contributed by each shot and measured by each sensor group. This is known as full fold coverage and is illustrated in FIG. 2. Taking CMP P1 as an example, reflection data is contributed by each shot S#1, S#2, S#3, S#4, and measured by each of the sensor groups 34$d$ and hence is full fold. Furthermore, the data includes all offsets i.e. all of the possible angles/travel times.

Attempts have been made to improve the surveying performance of this known system by operating in a high speed mode in which the SPI is equal to the group interval. It will be appreciated that in this context "high speed" refers not only the case where the absolute speed of the survey vessel is increased and the SPI remains constant, but also the case where the SPI is decreased and the speed of the survey vessel remains constant. These attempts, by making the SPI equal to the group interval, have run into a problem known colloquially in the industry as "odd and evens". As will be explained, this name arises because the sensor groups are, by convention, numbered consecutively with the sensor group closest to the sound source being allocated number 1 and the sensor group furthest from the sound source being allocated the highest number. Referring to FIG. 3, and taking CMP P1 and P2 as examples, it may be seen that the sound source 20 is covering a distance so large between shots that only reflection data from shots 2# and 3# contributes to the data gathered for CMP P1 and P2. Moreover, the data for CMP P1 comprises reflection data from sensor groups 34$d$2,4, i.e. the evenly numbered sensor groups, and the data for CMP P2 comprises reflection data from sensor groups 34$d$1,3, i.e. the oddly numbered sensor groups. As a result of the gathered reflection data, for neighbouring CMPs, being at different offsets, which offsets have different angles and travel times, the acquisition geometry becomes non-optimum and imprints artefacts in the imaging data that is generated.

US2012/0275264 discloses an arrangement in which a seismic source is positioned mid-way along a pair of vertically offset streamers. The streamers are vertically offset to allow for differentiation of the up-going pressure waves from the down-going pressure waves. There is no disclosure of the high speed operation, described hereinafter, that is contemplated by the present invention.

With this background in mind, according to a first aspect of the invention, the present invention may provide a system for surveying the structure beneath the seabed, comprising:

a survey vessel;

a streamer comprising a cable, a first set of N1 sensor groups positioned at a first end portion of the cable, the sensor groups of the first set being spaced from each other by a group interval, and a second set of N2 sensor groups positioned at a second end portion of the cable, the sensor groups of the second set being spaced from each other by the group interval;

a sound source;

wherein, when the system is in use, the survey vessel travels at a predetermined speed, towing the streamer and the sound source such that the sound source is positioned adjacent an intermediate portion of the cable between the first and second end portions of the cable;

the sound source sends acoustic pulses at a predetermined period between pulses towards the seabed such that reflections are produced towards both the first set of sensor groups and the second set of sensor groups; and the speed of the survey vessel and the predetermined period of the sound source are selected such that the shot point interval of the sound source equals the group interval.

By virtue of positioning the sound source between the first and second sets of sensor groups, the present invention is able, even when the sound source is travelling at a speed at which the shot point interval equals the group interval, to calculate image data for a given common mid point based on reflection data gathered by the first set of sensor groups for that common mid point and reflection data later gathered by the second set of sensor groups for that common mid point.

When the sensor groups are conventionally numbered, i.e. for the first set of sensor groups, the sensor group closest to the sound source is number 1 and the sensor group furthest from the sound source is sensor group number N, and, for the second set of sensor groups, the sensor group closest to the sound source is number 1 and the sensor group furthest from the sound source is sensor group number N2, preferably, the system is such that, for a given common mid point, the reflection data gathered from the first set of sensor groups originates from only one of the oddly or evenly numbered sensor groups, and the reflection data later gathered from the second set of sensor groups, for that common mid point, originates from only the other of the oddly or evenly numbered sensor groups.

In the case that N1=N2, the "odds and evens" problem is completely solved because, for each common mid point, the combination of reflection data gathered by both the first and second sets of sensor groups constitutes reflection data that corresponds to all possible offsets.

Preferably, the sound source is positioned midway between the closest sensor group of the first set of sensor groups and the closest sensor group of the second set of sensor groups.

Preferably, each sensor group is operable, treating each sensor of the sensor group as part of a sensor array, to perform a sensor array conditioning operation on the reflection data and to output the conditioned reflection data for subsequent data processing. In other embodiments, the sensor array conditioning for each sensor group is undertaken during subsequent data processing.

Preferably, the system is switchable between a high speed mode as defined according to the above-mentioned first aspect of the invention to a standard speed mode in which the speed of the survey vessel and the period between pulses of the sound source are selected such that the shot point interval of the sound source equals half the group interval.

According to a second aspect the present invention may provide a method for surveying the structure beneath the seabed using a survey system comprising a survey vessel, a streamer comprising a cable, a first set of N1 sensor groups positioned at a first end portion of the cable, the sensor groups of the first set being spaced from each other by a group interval and a second set of N2 sensor groups positioned at a second end portion of the cable, the sensor groups of the second set being spaced from each other by the group interval, and a sound source, the method comprising:

towing the streamer and the sound source such that the sound source is adjacent an intermediate portion of the cable between the first and second end portions of the cable;

the sound source sending acoustic pulses at a predetermined period between pulses towards the seabed, the pulses being such that they are reflected both towards the first set of sensor groups and the second set of sensor groups;

the speed of the survey vessel and the predetermined period of the sound source being selected such that the shot point interval of the sound source equals the group interval.

In the context of the present invention, the term "seabed" is to be construed broadly so as to cover the floor of other expanses of water, such as that of an ocean or a lake, regardless of whether the other expanses of water are technically seas or not.

Exemplary embodiments of the invention are hereinafter described with reference to the accompanying drawings, in which.

Figure 1:
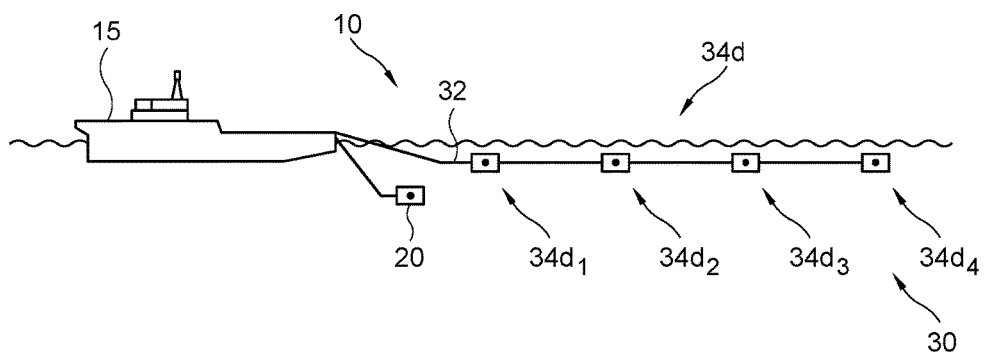
FIG. 1 shows a known surveying system.
Figure 2:
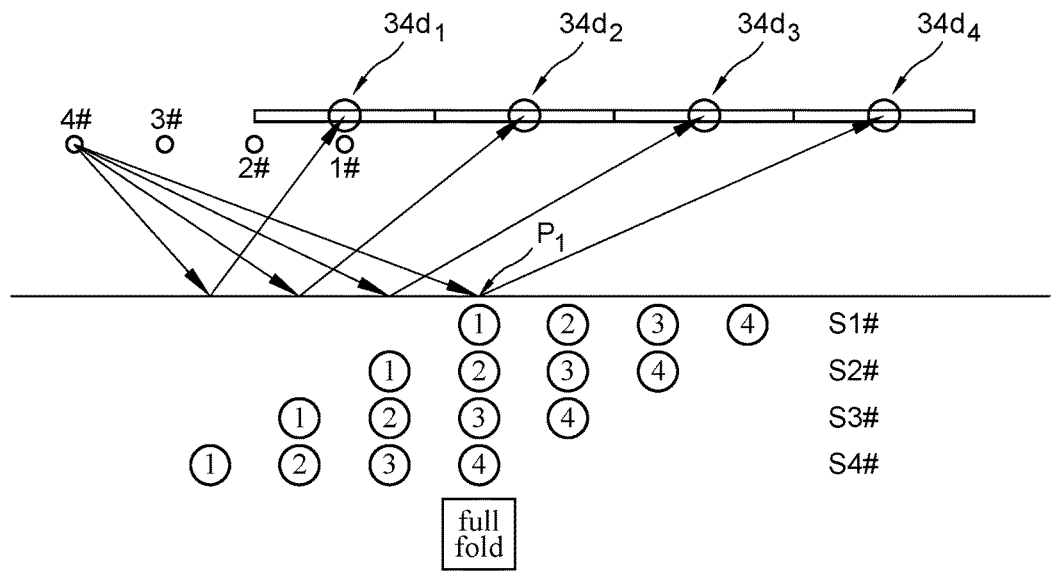
FIG. 2 shows the surveying system of FIG. 1 operating at standard speed.
Figure 3:
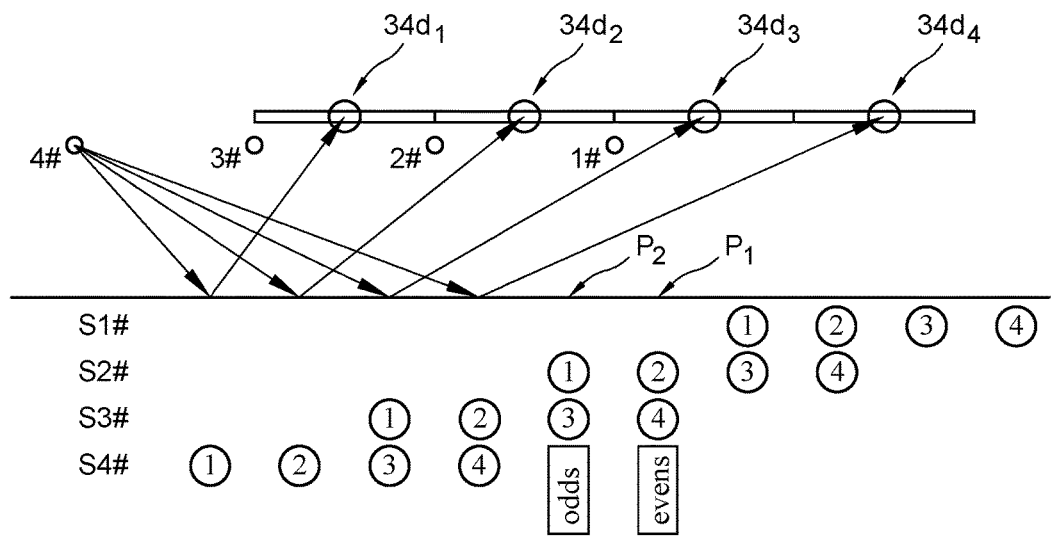
FIG. 3 shows the surveying system of FIG. 1 operating at high speed.
Figure 5A:
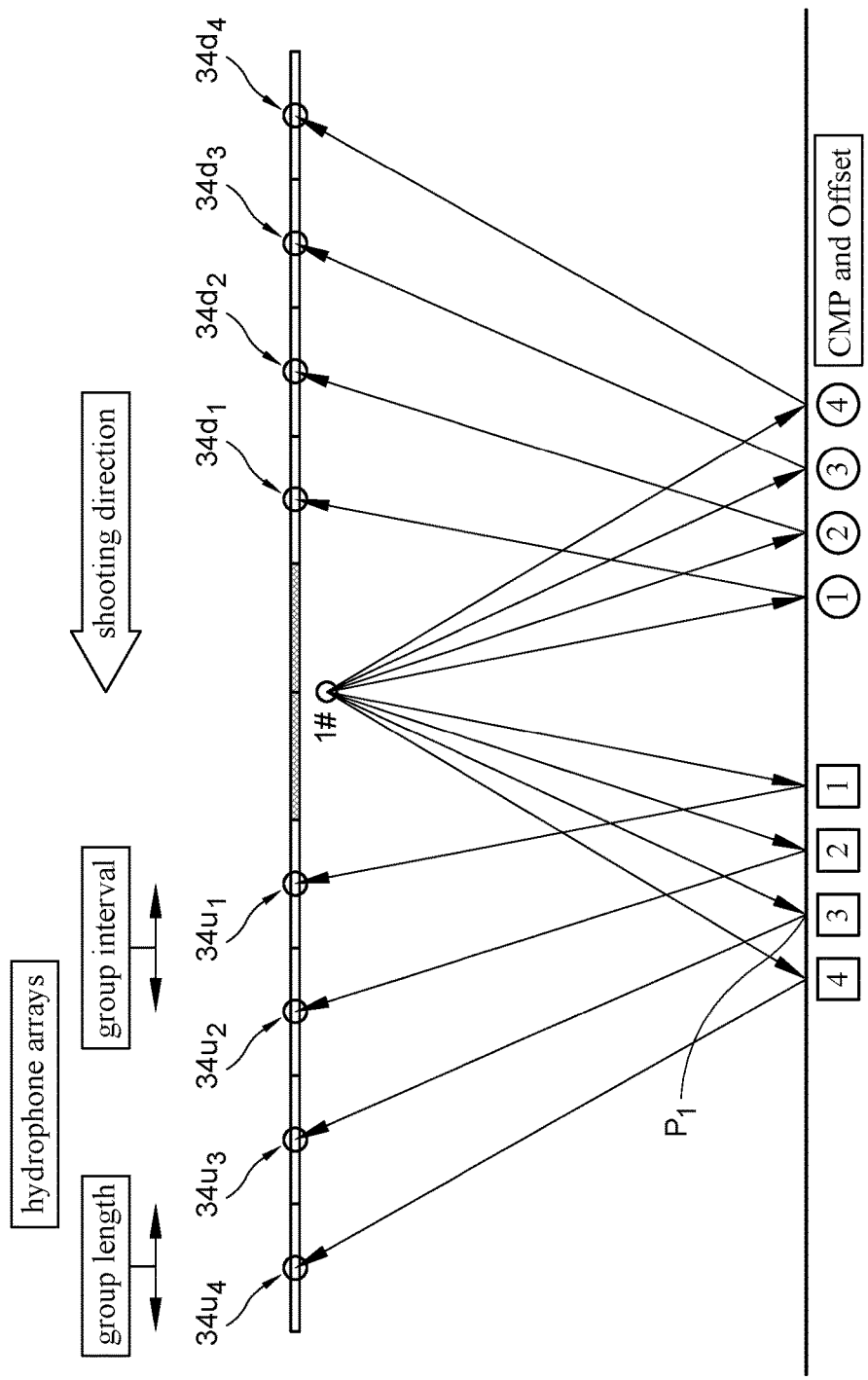
Figure 6:
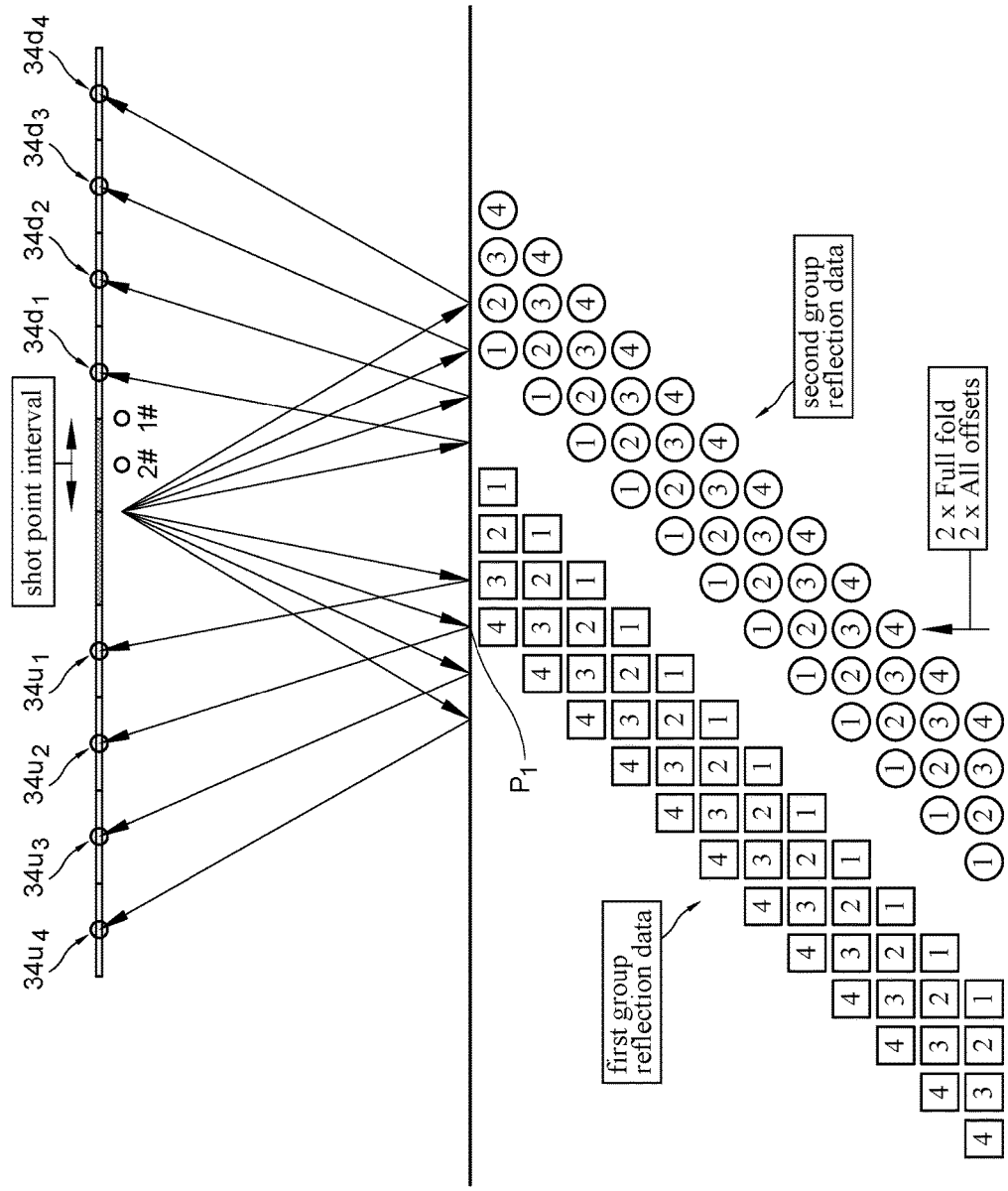

FIGS. 4(a),4(b) show a view from above and a side view, respectively, of a surveying system in accordance with the invention;

FIGS. 5(a),(b),(c) show the surveying system of FIG. 4 operating at high speed; and FIG. 6 shows the surveying system of FIG. 4 operating at standard speed.

A system 10 for surveying the structure beneath the seabed in accordance with an embodiment of the invention is shown in FIGS. 4(a),(b). The system 10 comprises a survey vessel 15.

Referring to FIG. 4(b), the system 10 further comprises a streamer 30 comprising a cable 32, a first set 34u of N1 sensor groups positioned at a first leading end portion of the cable, and a second set 34d of N2 sensor groups positioned at a second trailing end portion of the cable. The sensor groups in the first set 34u each have a constant length, known as the group length, and are spaced from each other by the group interval as measured from the center of adjacent sensor groups. Similarly, the sensor groups in the second set 34d have the same group length and group interval. As examples, the group interval and group length may be 3.125 m, 6.25 m or 12.5 m. In this embodiment, N1 is equal to N2. For the purposes of diagrammatic simplicity, the first set is shown where N1=4 comprising sensor groups 34u1,2,3,4 and the second set is shown where N2=4 comprising sensor groups 34d1,2,3,4. However, in one practical embodiment, for example, N1 and N2 may equal more than 50 with a cable length longer than 2 km, preferably more than 100 with a cable length longer than 5 km. As a minimum in a practical embodiment, N1 and N2 may be 6.

The system 10 further comprises a sound source 20 for generating acoustic pulses or shots with a predetermined period between pulses. The pulses generated by the sound source 20 are directed towards the seabed where they produce reflections simultaneously towards both the first set 34u and the second set 34d of sensor groups. The interval between shots may be between 1 and 12 seconds, typically 3 to 8 seconds. The sound source 20 may be a single air gun or an array of air guns.

Each sensor group comprises a plurality of sensors, which sensors may be hydrophones, and a local controller 35. The local controller 35 is operable, treating each sensor as part of a sensor array, to perform a sensor array conditioning operation on the raw reflection data. The sensor array conditioning operation typically comprises summing the data recorded at each sensor within the sensor group. The location of the summed output is assumed to be at the center of the sensor group. The local controller 35 outputs a data stream of conditioned reflection data for that sensor group. The conditioning operation on the raw reflection data has the effect of cancelling out the relatively large and unwanted component of the signal that is received directly from the sound source 20 leaving only the wanted and relatively small component of the signal that is reflected from the seabed. In other embodiments, the local controller 35 outputs a data stream of reflection data for that sensor group which has not yet undergone sensor array conditioning and the sensor array conditioning operation is undertaken during subsequent data processing.

The system 10 further comprises an on-board controller 18 which controls the operation of the sound source 20, and receives the conditioned reflection data from the sensor groups 34u,d. Based on the received reflection data, the system 10 generates imaging data of the structure beneath the seabed.

The system 10 is arranged such that the surveying vessel 15 tows the streamer 30 with the sound source 20 positioned adjacent an intermediate portion of the cable between the first and second end portions. In this embodiment, the sound source is at equidistant the mid-point between the (center of the) trailing sensor group 34u1 of the first set 34u and the (center of the) leading sensor group 34d1 of the second set 34d. The overall distance between the trailing sensor group 34*u*1 and the leading sensor group 34*d*1 is selected depending on the survey objectives and parameters, in particular the water depth. To achieve the required positioning, the sound source 20 may form part of the streamer 30, i.e. not have its own towing line, and be attached to the cable 32, or the sound source 20 may have its own towing line of an appropriate length as is visible in FIG. 4(*a*).

The system 10 will now be described operating in a high speed mode, in which the SPI equals the group interval, with reference to FIGS. 5(*a-c*).

Figure 5B:
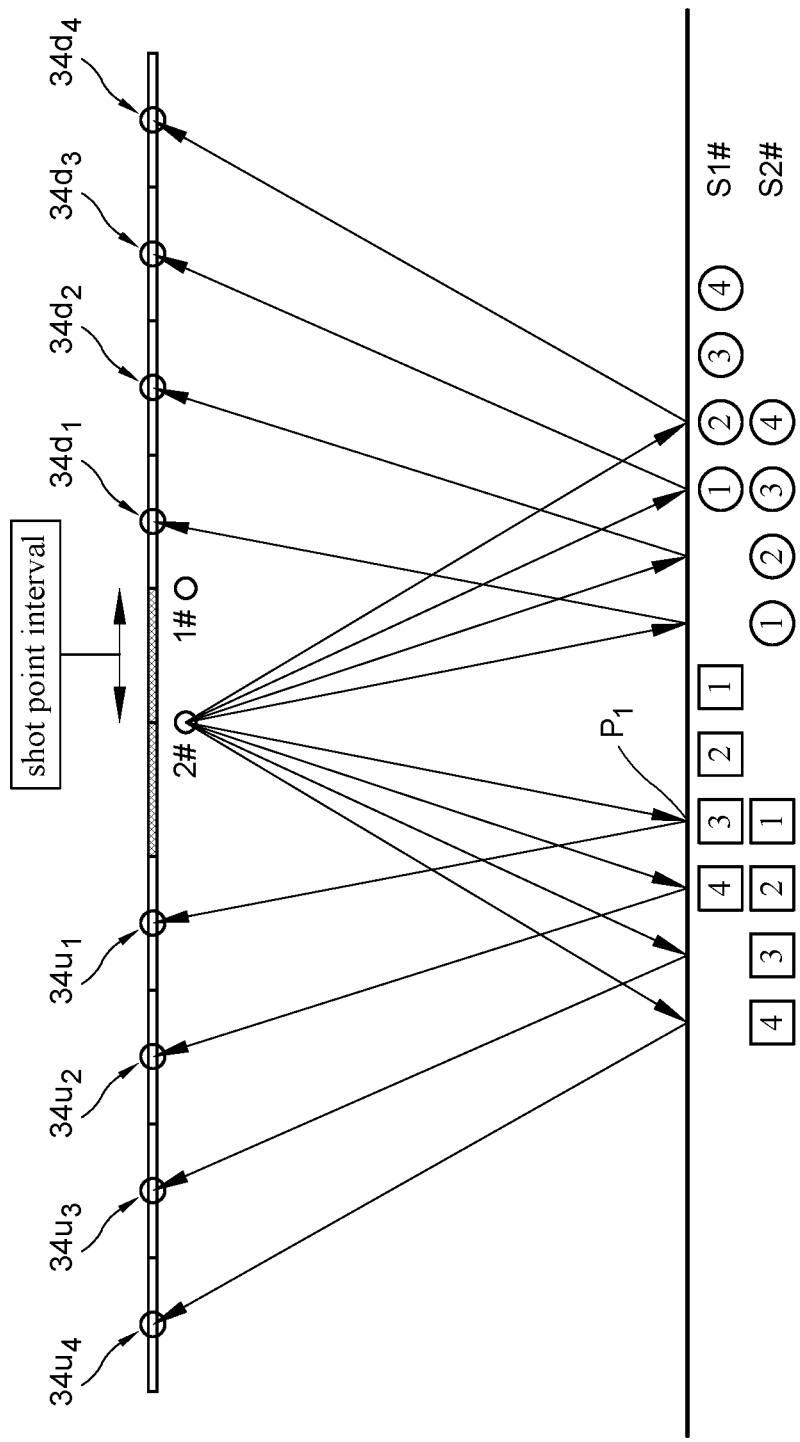
Figure 5C:
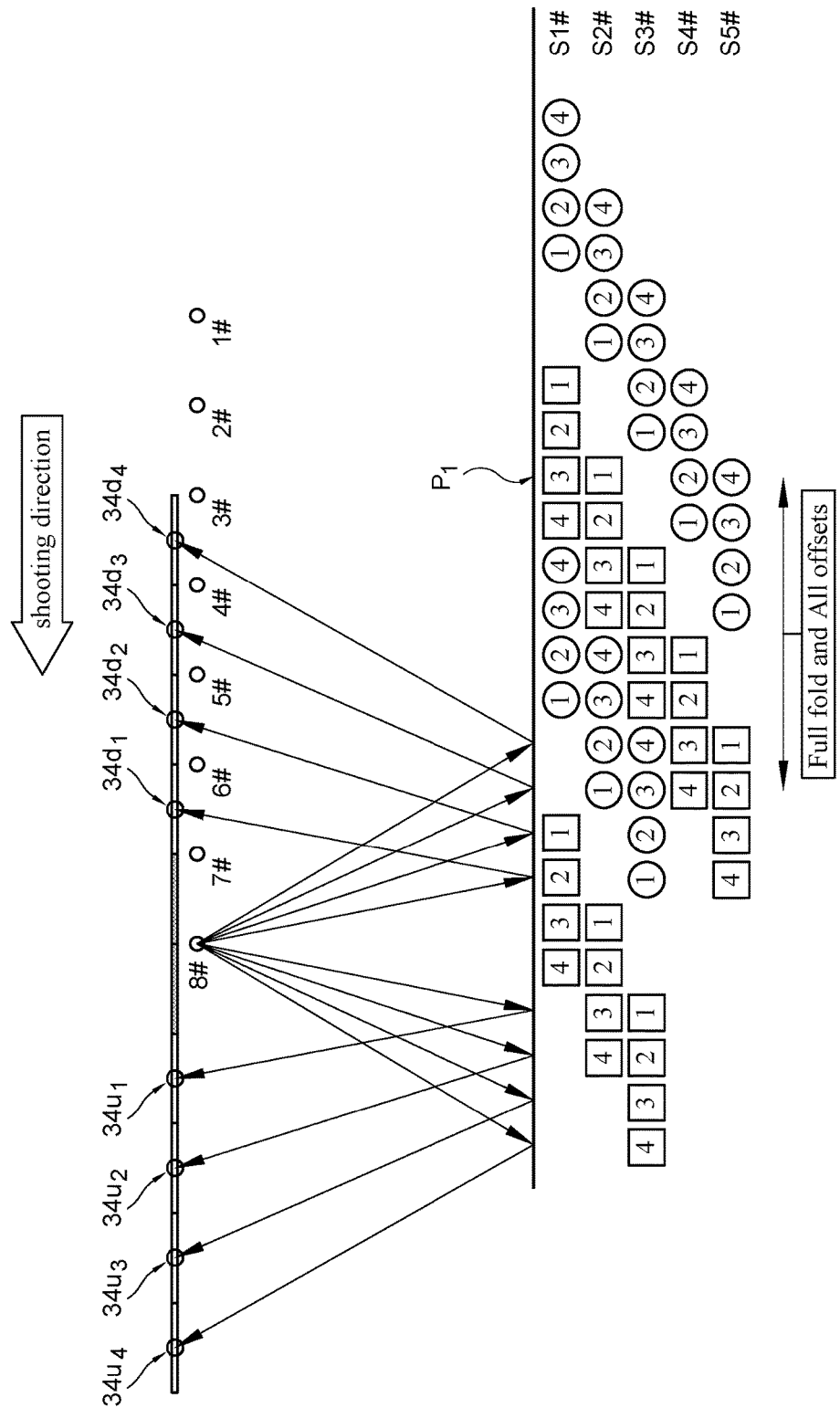

FIG. 5(*a*) shows the reflection data generated after shot #1. To illustrate the operation of this embodiment of the invention, particular attention is drawn to CMP P1 which in relation to shot #1 generates a reflection which is gathered by sensor group 34*u*3 in the first leading set 34*u*.

FIG. 5(*b*) shows the reflection data generated after shot #2. Referring to CMP P1 in relation to shot #2 generates a reflection which is gathered by 34*u*1 in the first leading set 34*u*. It will be noted that, at this instant in time, for CMP P1, only data from oddly numbered sensor groups has been gather due to the large distance that the sound source travels between successive shots.

FIG. 5(*c*) shows the reflection data generated after shot 8#. It may be seen that two further items of reflection data have been gathered for CMP P1, namely reflection data from shot #4 which was gathered by the sensor group 34*d*2 and reflection data from shot #5 which was gather by the sensor group 34*d*4. It will noted that, for CMP P1, the reflection data gathered by the second set 34*d* sensor groups comprises reflection data gathered by evenly numbered sensor groups.

Thus, the reflection data gathered first by the first set 34*u* of sensor groups from its oddly numbered sensor groups 34*u*3,1 and the reflection data gathered later by the second set 34*d* of sensor groups from its evenly numbered sensor groups 34*d*2,4 together constitutes reflection data that corresponding to all possible offsets, i.e. angles/travel times, for the CMP P1. Subsequent processing of this data would generate an imaged output that is not corrupted by artefacts of the acquisition geometry.

The system 10 will now be described operating in a standard speed mode, in which the SPI equals half the group interval, with reference to FIG. 6. FIG. 6 shows the system 10 in a position after 2 shots have been generated, but the reflection data that is shown is what has already been gathered by the first and second sets 34*u,d* of sensor groups and what will be gathered by the first and second sets 34*u,d* of sensor groups after 9 more shots have been generated. Referring to CMP P1 as an example, it may be seen that each of the first and second set of sensor groups produces itself reflection data that corresponds to all possible offsets for CMP P1. So although there is duplication in the reflection data, such duplication can be useful in improving the signal-to-noise ratio of the reflection data.

Although it is preferred that N1=N2, in accordance with the present invention, this need not always be the case. The case where N2=N1+X is now considered as an example. In high speed mode when surveying a shallow section of the seabed, it is most preferable that the image data for each CMP is calculated on the basis of all possible offsets. However, the data contribution from sensor groups of increasing offset is generally controlled during processing by a process called muting. A typical muting scheme allows contribution from progressively increasing offsets as the recording time increases. Therefore, in high speed mode when surveying a deep section of the seabed, since image data for a CMP calculated on the basis of just "odd and evens" data is better tolerated at greater depths, the reflection data gathered by the X sensor groups with the longest offset of the first set of sensor groups may be used even though those sensor groups have no opposite number in the second set of sensor groups.

In other embodiments, the group length and the group interval need not be equal. In other embodiments, the streamer 30 may not be horizontal, but may be arranged to slant downwardly.

In the above-described embodiments, the survey vessel 15 tows a single sound source 20 and a single streamer 30. In other embodiments, the survey vessel 15 may tow a single sound source 20 and a plurality of streamers 30, wherein each of the streamers 30 receives reflections of pulses generated by the single sound source 20. In still further embodiments, the survey vessel 15 may tow a plurality of sound sources 20 and a plurality of streamers 30.

The invention claimed is:

1. A system for surveying a structure beneath a seabed, comprising:
    a survey vessel;
    a controller on-board the survey vessel
    a sound source;
    a streamer comprising a cable, a first set of sensor groups positioned at a first end portion of the cable, the first set of sensor groups being spaced from each other by a group interval, and a second set of sensor groups positioned at a second end portion of the cable, the second set of sensor groups being spaced from each other by the group interval;
    wherein the streamer and the sound source are adapted such that, when towed, the first end portion of the cable is a leading end portion of the cable and the sound source is positioned adjacent an intermediate portion of the cable between the first and second end portions of the cable, wherein, for both sets of sensor groups, each sensor group is numbered consecutively with the sensor group closest to the sound source being numbered 1;
    wherein,
    the survey vessel is configured to tow the streamer and the sound source at a predetermined speed;
    the controller is configured to control the sound source such that the sound source sends acoustic pulses at a predetermined period between pulses towards the seabed, each pulse being shaped such that reflections are produced towards both the first set of sensor groups and the second set of sensor groups;
    wherein the predetermined speed and the predetermined period are selected such that a shot point interval of the sound source equals the group interval;
    wherein the controller is configured to receive reflection data from the first and second set of sensor groups, wherein, for a given common mid point, the reflection data consists of either (i) reflection data gathered from oddly numbered sensors of the first set of sensor groups and reflection data gathered from evenly numbered sensors of the second set of sensor groups or (ii) reflection data gathered from evenly numbered sensors of the first set of sensor groups and reflection data gathered from oddly numbered sensors of the second set of sensor groups.

2. The system as in claim 1, wherein the sound source is a single air gun or an array of air guns.

3. The system as in claim 1, wherein the number of sensor groups in the first set equals the number of sensor groups in the second set.

4. The system as in claim 1, comprising a single sound source associated with the streamer.

5. The system as in claim 1, comprising a plurality of said streamers.

6. The system as in claim 5, wherein more than one of said plurality of streamers receives reflections of pulses generated by the sound source.

7. The system as in claim 1, wherein each sensor group comprises a plurality of hydrophones.

8. A method for surveying a structure beneath a seabed using a survey system comprising a survey vessel, a streamer comprising a cable, a first set of sensor groups positioned at a first end portion of the cable, the first set of sensor groups being spaced from each other by a group interval and a second set of sensor groups positioned at a second end portion of the cable, the second set of sensor groups being spaced from each other by the group interval, and a sound source, the method comprising:

towing the streamer and the sound source such that a first end portion of the cable is a leading end portion of the cable and the sound source is adjacent an intermediate portion of the cable between the first and second end portions of the cable, wherein, for both sets of sensor groups, each sensor group is numbered consecutively with the sensor group closest to the sound source being numbered 1;

sending, by the sound source, acoustic pulses at a predetermined period between pulses towards the seabed, the pulses being such that they are reflected both towards the first set of sensor groups and the second set of sensor groups; and wherein the predetermined speed and the predetermined period are selected such that a shot point interval of the sound source equals the group interval; and for a given common mid point, gathering reflection data consisting of either (i) reflection data from oddly numbered sensors of the first set of group sensors and reflection data from evenly numbered sensors of the second set of sensor groups or (ii) reflection data from evenly numbered sensors of the first set of sensor groups and reflection data from oddly numbered sensors of the second set of sensor groups.

* * * * *